3,682,803
PROCESS FOR THE PHOTOCHEMICAL
SULFOXIDATION OF n-PARAFFIN
Yuzuru Ogata, Sumio Arai, and Ichiro Iwasa, Wakayama, Japan, assignors to Kao Soap Co., Ltd., Tokyo, Japan
No Drawing. Filed Apr. 20, 1970, Ser. No. 30,209
Claims priority, application Japan, Apr. 23, 1969,
44/31,666
Int. Cl. B01j 1/10
U.S. Cl. 204—162 R  4 Claims

ABSTRACT OF THE DISCLOSURE

A process for the photochemical sulfoxidation of n-paraffin comprises irradiating n-paraffin having 10–20 carbon atoms exclusively with radiations within a limited wave length range, from which the rays of wave lengths shorter than 300 m$\mu$ were cut off in the presence of sulfur dioxide and oxygen whereby the formation of undesirable brownish resinous matter is prevented.

---

The present invention relates to an improvement in the process for the photochemical sulfoxidation of n-paraffin with sulfur dioxide and oxygen on the irradiation with ultra-violet rays and, in particular, it relates to a process characterized by reacting n-paraffin with sulfur dioxide and oxygen on the irradiation with ultra-violet rays having wave lengths within a limited wave length range from which the radiations of shorter wave lengths have been cut off in order to inhibit the formation of undesirable by-products.

The n-paraffin sulfonic acids are useful for example as raw materials for detergents and can be prepared by the photochemical sulfoxidation of n-paraffin. This photochemical sulfoxidation has been performed by using a mercury lamp as the light source and by introducing sulfur dioxide and oxygen into the reaction vessel containing n-paraffin under the irradiation of ultra-violet rays generated from said light source.

However, during this reaction, a brownish resinous matter will be produced and deposit onto the inner surface of the transparent reaction vessel wall provided between the light source and the photochemical reaction mixture, which phenomenon causes a lowering of the reaction rate. Therefore, a long continuous reaction operation will become impossible and said brownish resinous matter will be mixed into the product, which will give rise to the deterioration of a quality thereof and make the process for the purification of the product complex.

In order to prevent such phenomenon of the deposition of a brownish resinous matter during the photochemical sulfoxidation, there has been proposed a process comprising shielding from the light source the part of the transparent reaction vessel wall between the reaction mixture and the light source, which is not immersed with the reaction liquor. However, though the deposition of said brownish resinous matter can be prevented to some extent by this process, the effect is still unsatisfactory.

Accordingly, it is an object of the present invention to provide a process for overcoming the disadvantages which accompany the conventional processes such as described above, which process is characterized by irradiating the reaction system exclusively with ultra-violet rays of wave lengths within a limited wave length range by means of an appropriate modification of the apparatus such as a modification of the transparency of the reaction vessel wall, the provision of a filter inserted between the light source and the reaction system or a modification of the light source itself, preventing thereby the formation of said brownish resinous matter during the photochemical sulfoxidation of n-paraffin which proceeds by the irradiation of ultra-violet rays in the presence of sulfur dioxide and oxygen.

According to our studies, it has been revealed that the reaction rate and the state of deposition of said brownish resinous matter depend markedly on the wave length range of the ultra-violet rays to be employed in the photochemical sulfoxidation of n-paraffin.

We have found that, in the photochemical sulfoxidation of n-paraffin, radiations of wave lengths longer than 40 m$\mu$ will not cause the deposition of said brownish resinous matter but will make the reaction rate too slow to be suitable in practice, whereas radiations of wave lengths shorter than 300 m$\mu$ will cause a considerable deposition of said brownish resinous matter compared with the rate of the main reaction, which is considered not suitable. On the contrary, we have found that the irradiation using radiation of wave lengths within a particular wave length range of 300–400 m$\mu$ will carry out the photochemical sulfoxidation reaction with a sufficiently high reaction rate without the deposition of any appreciable amount of said brownish resinous matter. For example, as illustrated in the following example, if the irradiation with radiation in the range of wave lengths at around 254 m$\mu$ is compared with the irradiation with radiation in the range of wave lengths at around 366 m$\mu$, with an equal intensity of radiation (the determination of the intensity of radiation will be described later), the deposition of the brownish resinous matter was recognized at 4 hours after the commencement of the photo-induced reaction in the case of the irradiation with the radiations at 254 m$\mu$, whereas no formation of such resinous matter was observed even at 20 hours after the start of the reaction in the case of the irradiation with the radiation at 366 m$\mu$. Further, no appreciable difference in the initial reaction rate within 2 hours after the commencement of the reaction was observed between these two cases.

As the n-paraffin to be used in the present invention, any straight chain saturated hydrocarbon with 10–20 carbon atoms can be used.

A gaseous mixture of oxygen (or air) and sulfur dioxide can be used as the sulfoxidation agent in the photochemical sulfoxidation reaction, as is well known in the prior art. The suitable reaction temperature is 10–50° C. The pressure can be atmospheric pressure or a somewhat elevated pressure. Further, any conventional techniques which have been utilized in the photochemical sulfoxidation process can be adopted without the necessity of any alteration in the practice of the present invention.

The experimental apparatus employed in the following example will be illustrated hereinunder.

The reaction vessel was of 300 ml. in the capacity with an internal diameter of 60 mm., equipped with a jacket, the wall of the reaction vessel being made of quartz and transparent to radiation of all ranges of wave length. The jacket was cooled by water, while a spiral stirrer with having a width of 10 mm. was provided. An ultra high voltage mercury lamp (manufactured by Toshiba Electric Co., Ltd., Japan: SHL–100 UV 75 w. mercury lamp for scientific use) was utilized as the light source and the reaction vessel was irradiated from outside by this light source, which was placed at a distance of 50 mm. from the side wall of the reaction vessel. In the respective experiments a light filter was inserted between the light source and the reaction vessel to limit the wave length region of the transmitted light to the respective particular ranges. Table 1 shows the filters used in the respective experiments.

TABLE 1

| Filter | | Wave length (mµ) of the transmitted light | Number of photons hν/sec. |
|---|---|---|---|
| No. 1 | UV-D25 | 240-400 | $4.56 \times 10^{15}$ |
| No. 2 | {UV-D25, NiSO₄ solution (1)} | 254 | $1.67 \times 10^{15}$ |
| No. 3 | {UV-D25, UV-D29 (2 sheets), NiSO₄ solution (1)} | 297 | $6.02 \times 10^{14}$ |
| No. 4 | {NiSO₄ solution (2), Potassium hydrogen phthalate solution} | 313 | $2.98 \times 10^{14}$ |
| No. 5 | UV-DIB | 366 | $1.53 \times 10^{15}$ |
| No. 6 | UV-39 | >390 | |

NOTE 1.—The filters UV-D25, UV-29, UV-DIB, and UV-39 used were manufactured by Toshiba Electric Co., Ltd., Japan.
NOTE 2.—The NiSO₄ solution (1) was prepared by dissolving 100 g. of NiSO₄·7H₂O in 100 ml. of water and placed in a quartz cell (the length of the liquid layer: 10 mm.).
NOTE 3.—The NiSO₄ solution (2) was prepared by dissolving 46 g. of NiSO₄·7H₂O and 14 g. of CoSO₄·7H₂O in 100 ml. of water and placed in a quartz cell (the length of the liquid layer: 30 mm.).
NOTE 4.—The potassium hydrogen phthlate solution was prepared by dissolving 5 g. of potassium hydrogen phthalate in 1 l. of water and placed in a quartz cell (the length of the liquid layer: 10 mm.).
NOTE 5.—The number of photons was calculated as follows: An aqueous solution of uranyl oxalate was prepared by mixing equal volumes of an aqueous 0.02 M oxalic acid solution and an aqueous 0.10 M uranyl sulfate solution) and 200 ml. of this uranyl oxalate solution, which is equal to the amount of n-paraffin to be used, was placed in the reaction vessel and irradiated with the radiation of the respective specified wave length during a specified time (approximately 5 hours) by stirring the solution at 25° C. and then a 10 ml. sample of the irradiated aqueous uranyl oxalate solution was taken, added with 1 ml. of conc. sulfuric acid, titrated with 0.1 N-KMnO₄ solution on warming to 80° C. The number of photons was calculated according to the following formula:

$$\text{Number of photons} = \frac{(A-B) \times 6.02 \times 10^{15} \times f}{2 \times \phi \times t} \quad (h\nu/\text{sec.})$$

In this formula, A is the volume in ml. of the 0.1 N-KMnO₄ solution required for the oxidation of the blank, B is the volume in ml. of the 0.1 N-KMnO₄ solution required for the oxidation of the sample, $f$ is the factor of the 0.1 N-KMnO₄ solution, $t$ is time in hrs., $\phi$ is the photolytic quantum yield of uranyl oxalate at 25°C. as listed in Table 2.

TABLE 2

| Wave length (mµ) | φ | Wave length (mµ) | φ |
|---|---|---|---|
| 208 | 0.47-0.50 | 335 | 0.530 |
| 255 | 0.602 | 366 | 0.492 |
| 265 | 0.582 | 406 | 0.563 |
| 300 | 0.570 | 435 | 0.584 |
| 313 | 0.561 | | |

The process of the present invention can be conducted either as a batch process or as a continuous process, but the reaction rate and the state of deposition of the brownish resinous matter are not much different between both processes. Accordingly, an example of the experimental method will be illustrated hereinunder only with regard to the continuous process. 200 ml. of n-paraffin is placed in the reaction vessel, into which is blown a gaseous mixture comprising sulfur dioxide and oxygen at the flow rates of 10 l. SO₂/hr., and 5 l. O₂/hr. from the bottom of the vessel and the reaction mixture is stirred at 1000-2000 r.p.m. at 10-50° C. The replacement of the gases in the reaction system will be completed within about 20-30 minutes and then the photo-irradiation is commenced and the n-paraffin sulfonic acid and persulfonic acid formed by the reaction as precipitates are withdrawn at a predetermined time interval, whereas the fresh n-paraffin is added dropwise to the reaction mixture in the amount corresponding to the maount of the product withdrawn from the reaction vessel.

The reaction temperature within the range of 10-50° C. is considered suitable as stated above. The reaction rate will vary somewhat depending on the temperature, but the variation is negligible in the practical point of view.

The influence of the stirring velocity is not appreciable within the range of 1000-2000 r.p.m. stated above.

The amounts of sulfur dioxide and oxygen were found to be indifferent to the reaction provided that both components were used in excess.

EXAMPLE

The olefin n-C₁₄H₂₈ manufactured by Gulf Co. was hydrogenated, then treated with a concentrated sulfuric acid, followed by washing with water, drying and subjecting to distillation under a reduced pressure after the drying. 200 ml. of the thus obtained paraffin as the starting material was placed in the reaction vessel and subjected to a photochemical sulfoxidation at 20° C. with stirring at 1500 r.p.m., during which a gaseous mixture of sulfur dioxide and oxygen was blown from the bottom of the vessel at the flow rates of 10 l. SO₂/hr. and 5 l. O₂/hr. and the photo-irradiation of the respective specified wave length range was conducted by using the various kinds of filters listed in Table 1. The reaction operation was carried out for 20 hours and, at each interval of two hours, the precipitates of the n-paraffin sulfonic acid and persulfonic acid formed by the reaction were withdrawn from the reaction vessel and the starting material was added to the reaction mixture dropwise in the same amount equal to the amount of the products withdrawn. The results are shown in Table 3.

Analysis of the starting material (n-paraffin):

| | Percent |
|---|---|
| n-C₁₄H₃₀ | 94.8 |
| n-C₁₂H₂₆ | 0.2 |
| n-C₁₆H₃₄ | 0.4 |
| Other components | 4.6 |

Boiling point=103.5° C./3 mm. Hg.
Bromine Index=0.

TABLE 3

| Filter | Reaction rate (percent/hr.) | Deposition of resinous matter |
|---|---|---|
| No. 1 | 10.2 | Deposition recognized after 3 hrs. |
| No. 2 | 9.0 | Deposition recognized after 4 hrs. |
| No. 3 | 10.2 | Deposition recognized after 10 hrs. |
| No. 4 | 6.4 | No deposition recognized. |
| No. 5 | 10.6 | Do. |
| No. 6 | 0 | Do. |

NOTE 1.—The reaction rate was calculated from the amount of the n-paraffin sulfonic acid and persulfonic acid in the precipitates withdrawn from the reaction vessel and the value of the reaction rate until 4 hours from the beginning of the reaction was shown as the initial reaction rate. The percentage was based on the volume of the reactant (200 ml.) in the reaction vessel.

As obvious from the above table, in the region of short wave lengths in which the filters No. 1, No. 2, and No. 3 were respectively used (hereinafter the wave lengths shorter than 300 mµ are referred to as "short wave length") and the wave lengths longer than 300 mµ are referred to as "long wave length," considerable depositions of the brownish resinous matter were observed, whereas, in the region of long wave lengths, depositions of the brownish resinous matter were not recognized at all.

The reaction rate after 20 hours was found to be approximately equal to the initial reaction rate (after four hours) in the case of the radiations of the long wave length region but, on the contrary, the reaction rate after 20 hours was considerably reduced from the initial reaction rate in the case of the radiations of the short wave length region. For example, it was reduced to below 10% of the initial rate in the cases of the filters No. 1 and No. 2 and to about 50% of the initial reaction rate in the case of the filter No. 3, due to the shielding of radiation by the deposited brownish resinous matter. The small reaction rate in the case of the filter No. 4 is considered to be presumably due to the small number of photons in the photochemical reaction. The reaction did not proceed at all in the case of the filter No. 6, in which only the radiations in region of wave lengths longer than 390 mµ were irradiated.

What we claim is:
1. A process for the photochemical sulfoxidation of n-paraffin which comprises irradiating n-paraffin having 10-20 carbon atoms, in the liquid phase, exclusively with radiation within the wave length range of 300–400 mµ, in the presence of sulfur dioxide and oxygen.

2. The process as claimed in claim 1, wherein said n-paraffin is kept at the temperature of 10 to 50° C. during the irradiation.

3. The process as claimed in claim 1, wherein said n-paraffin is stirred at 1000 to 2000 r.p.m. by a stirrer during the irradiation.

4. The process as claimed in claim 1, wherein the radiation within the wave length range of 300–400 mµ are provided by inserting a filter that can transmit only radiations within the above range between the light source and the reaction mixture.

References Cited

UNITED STATES PATENTS

| | | | |
|---|---|---|---|
| 3,461,053 | 8/1969 | Dimond | 204—162 R |
| 3,337,437 | 8/1967 | Furrow et al. | 204—162 R |
| 3,336,210 | 8/1967 | Furrow | 204—162 R |
| 2,702,273 | 2/1955 | Kennedy | 204—162 R |

FOREIGN PATENTS

| | | | |
|---|---|---|---|
| 42/24,483 | 4/1966 | Japan | 204—162 R |
| 43/29,367 | 12/1968 | Japan | 204—162 R |

BENJAMIN R. PADGETT, Primary Examiner